United States Patent
Lee et al.

(10) Patent No.: US 7,118,120 B2
(45) Date of Patent: Oct. 10, 2006

(54) POWERED RUNNING BOARD

(75) Inventors: V-Bond Lee, Mississauga (CA); Anthony Wolf, Thornhill (CA); Zygmunt Piotrowski, Woodbridge (CA); Jason Hepner, Davisburg, MI (US)

(73) Assignee: Magna International Inc., Aurora (CA)

( * ) Notice: Subject to any disclaimer, the term of this patent is extended or adjusted under 35 U.S.C. 154(b) by 83 days.

(21) Appl. No.: 10/896,625

(22) Filed: Jul. 22, 2004

(65) Prior Publication Data
US 2005/0035568 A1  Feb. 17, 2005

(51) Int. Cl.
B60R 3/00 (2006.01)

(52) U.S. Cl. ...................... 280/166; 280/163
(58) Field of Classification Search ................ 180/163, 180/166, 763.1, 164.1, 169
See application file for complete search history.

(56) References Cited

U.S. PATENT DOCUMENTS

| | | | |
|---|---|---|---|
| 3,095,216 A | 6/1963 | Browne et al. | |
| 3,887,217 A | 6/1975 | Thomas | |
| 4,073,502 A | 2/1978 | Frank et al. | |
| 5,498,012 A | 3/1996 | McDaniel et al. | |
| 5,697,626 A * | 12/1997 | McDaniel et al. | 280/166 |
| 5,842,709 A * | 12/1998 | Maccabee | 280/166 |
| 6,325,397 B1 * | 12/2001 | Pascoe et al. | 280/166 |
| 6,375,207 B1 | 4/2002 | Dean et al. | |
| 6,641,158 B1 * | 11/2003 | Leitner | 280/166 |
| 6,830,257 B1 * | 12/2004 | Leitner | 280/166 |
| 6,834,875 B1 * | 12/2004 | Leitner et al. | 280/166 |
| 6,926,295 B1 * | 8/2005 | Berkebile et al. | 280/166 |
| 6,955,370 B1 * | 10/2005 | Fabiano et al. | 280/163 |
| 2003/0132595 A1 | 7/2003 | Fabiano et al. | |
| 2003/0184040 A1 | 10/2003 | Leitner et al. | |

* cited by examiner

Primary Examiner—Christopher P. Ellis
Assistant Examiner—Bridget Avery
(74) Attorney, Agent, or Firm—Clark Hill PLC

(57) ABSTRACT

A powered running board assembly has a deck and at least two hinges extending from the deck for mounting longitudinally the deck to an underside of a vehicle. Each hinge has a mounting bracket configured to mount to the underside of the vehicle. A pair of links pivotally extends between the deck and mounting bracket. The deck is movable between a retracted position and an extended position. A motor assembly operably engages at least one of the hinges to drive the deck between the retracted and extended positions. The motor assembly extends substantially longitudinally. The motor assembly has a gear train and clutch assembly enabling the motor assembly to drive relative to the deck movement when the deck movement is prevented, and enabling manual deck movement when the motor assembly is not energized.

6 Claims, 7 Drawing Sheets

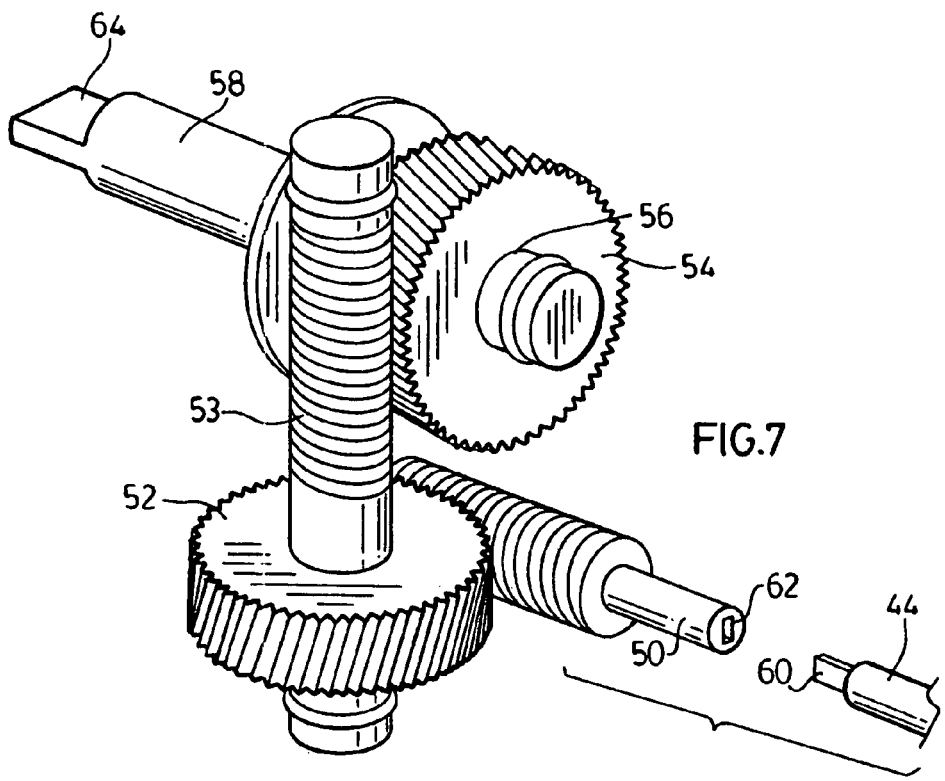
FIG. 7
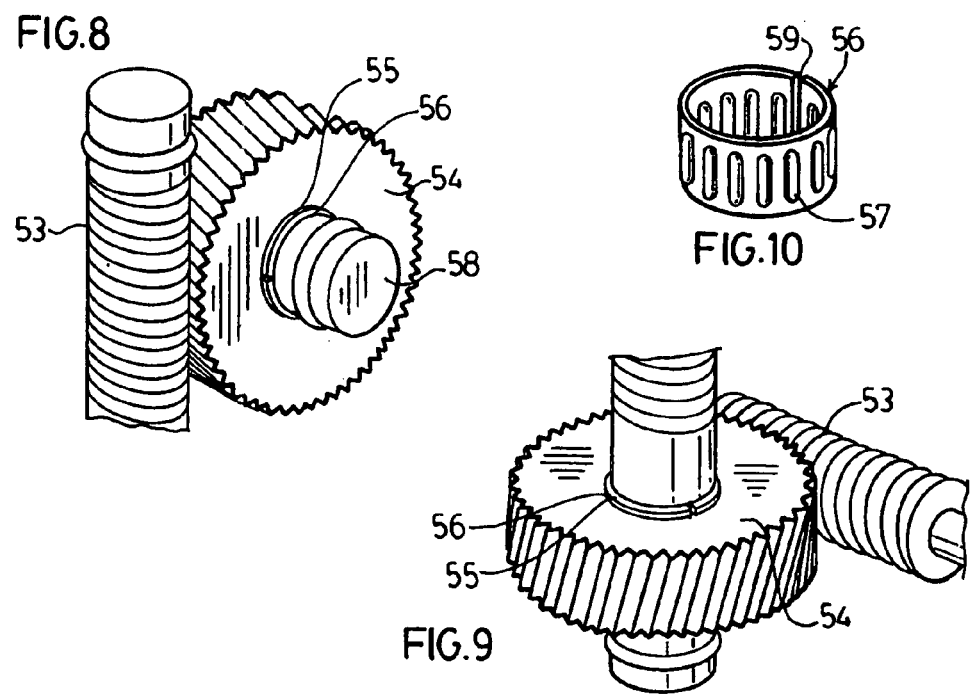
FIG. 8
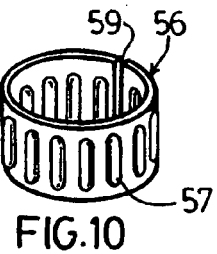
FIG. 10
FIG. 9

POWERED RUNNING BOARD

FIELD OF INVENTION

This invention relates to certain improvements to a powered running board.

BACKGROUND OF THE INVENTION

Running boards are available as an option for larger sized vehicles such as sport utility vehicles, pick-up trucks, mini-vans, and cross-ever vehicles. In model year 2003, the Lincoln Navigator became the first vehicle available with a factory installed powered running board. In this running board, the deck or stepping platform will automatically retract and extend upon closing and opening the door. This retractable running board is described in United States Patent Publication no. US 2002/0113400 ('400).

The '400 running board provides a deck that extends longitudinally along the side of the vehicle adjacent the rocker panel. The deck is operably connected to the vehicle by a set of four bar links. A drive motor is mounted in a generally horizontal condition, perpendicular to the longitudinal extent of the running board. This configuration is acceptable for the Lincoln Navigator as there is sufficient space beneath the vehicle where the running board mounts to the vehicle. However in other vehicles, there is insufficient space under the vehicle to mount the running board with the drive motor.

SUMMARY OF INVENTION

The disadvantages of the prior art may be overcome by providing a powered running board with a drive motor that is oriented generally parallel with the longitudinal extend of the running board.

According to one aspect of the invention, there is provided a powered running board assembly. The powered running board assembly has a longitudinally extending deck and at least two hinges extending from the deck for mounting the deck to an underside of a vehicle. Each hinge has a mounting bracket configured to mount to the underside of the vehicle. A pair of links pivotally extending between the deck and mounting bracket. The deck is movable between a retracted position and an extended position. A motor assembly operably engages at least one of the hinges to drive the deck between the retracted and extended positions. The motor assembly extends substantially longitudinally. The motor assembly has a gear train and clutch assembly enabling the motor assembly to drive relative to the deck movement when the deck movement is prevented, and enabling manual deck movement when the motor assembly is not energized.

DESCRIPTION OF THE DRAWINGS

In Figures that illustrate embodiments of the present invention,

FIG. 7 is a perspective view of the gear train and clutch assembly of the embodiment of FIG. 1;

FIG. 8 is a perspective view of the clutch mechanism of the gear and clutch assembly of FIG. 7;

FIG. 9 is a perspective view of the clutch mechanism of FIG. 8, from a reverse angle; and FIG. 10 is a perspective view of the clutch ring of the clutch mechanism of FIG. 8.

DESCRIPTION OF THE INVENTION

Figure 1:
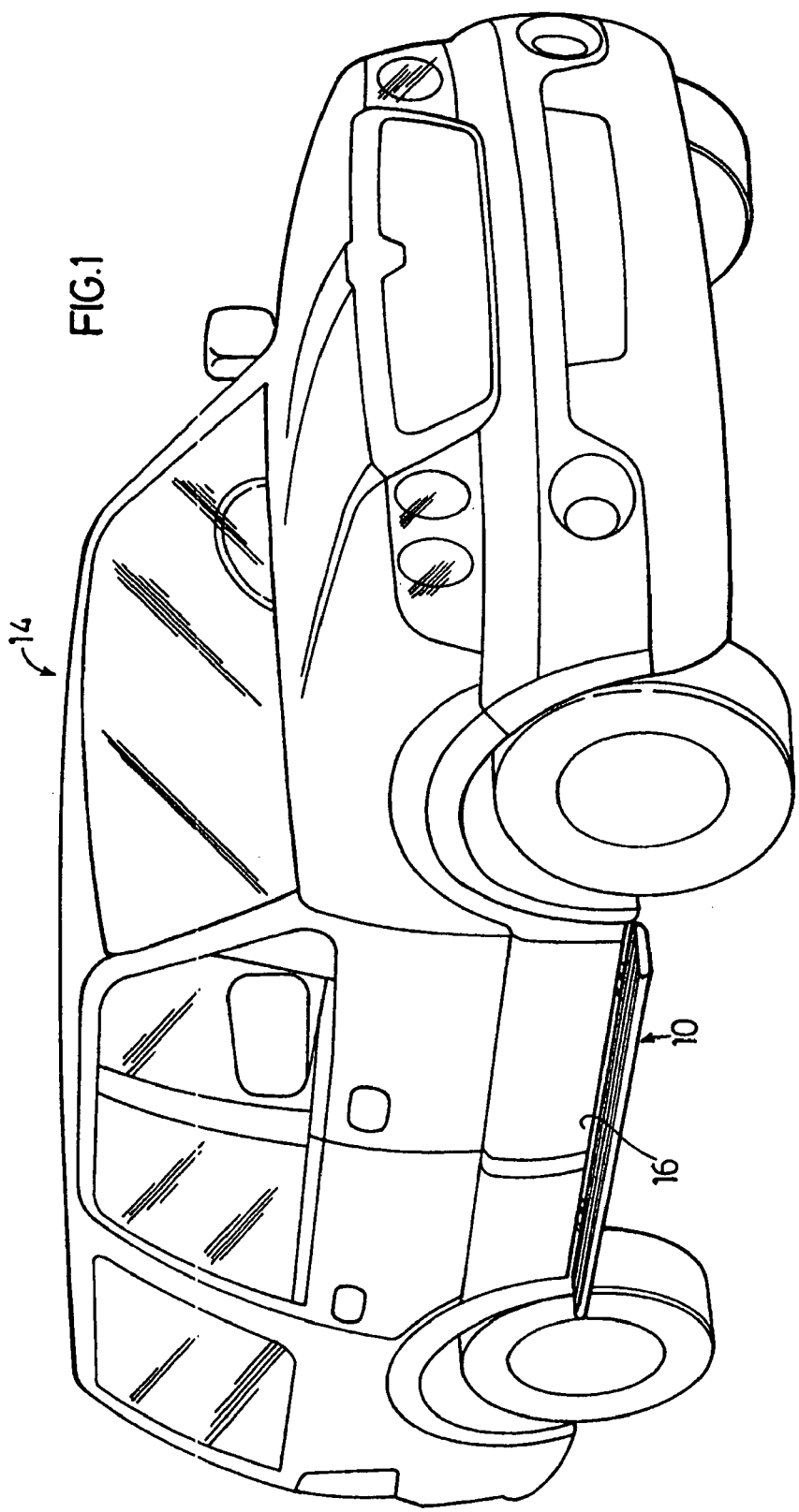
FIG. 1 is a perspective view of the preferred embodiment of the present invention.

The powered running board 10 of the present invention is generally illustrated in FIG. 1. The running board 10 is mounted in the underside of the vehicle 14 along the rocker panel 16. The running board 10 extends in a generally longitudinal direction relative to the vehicle 14.

Figure 2:
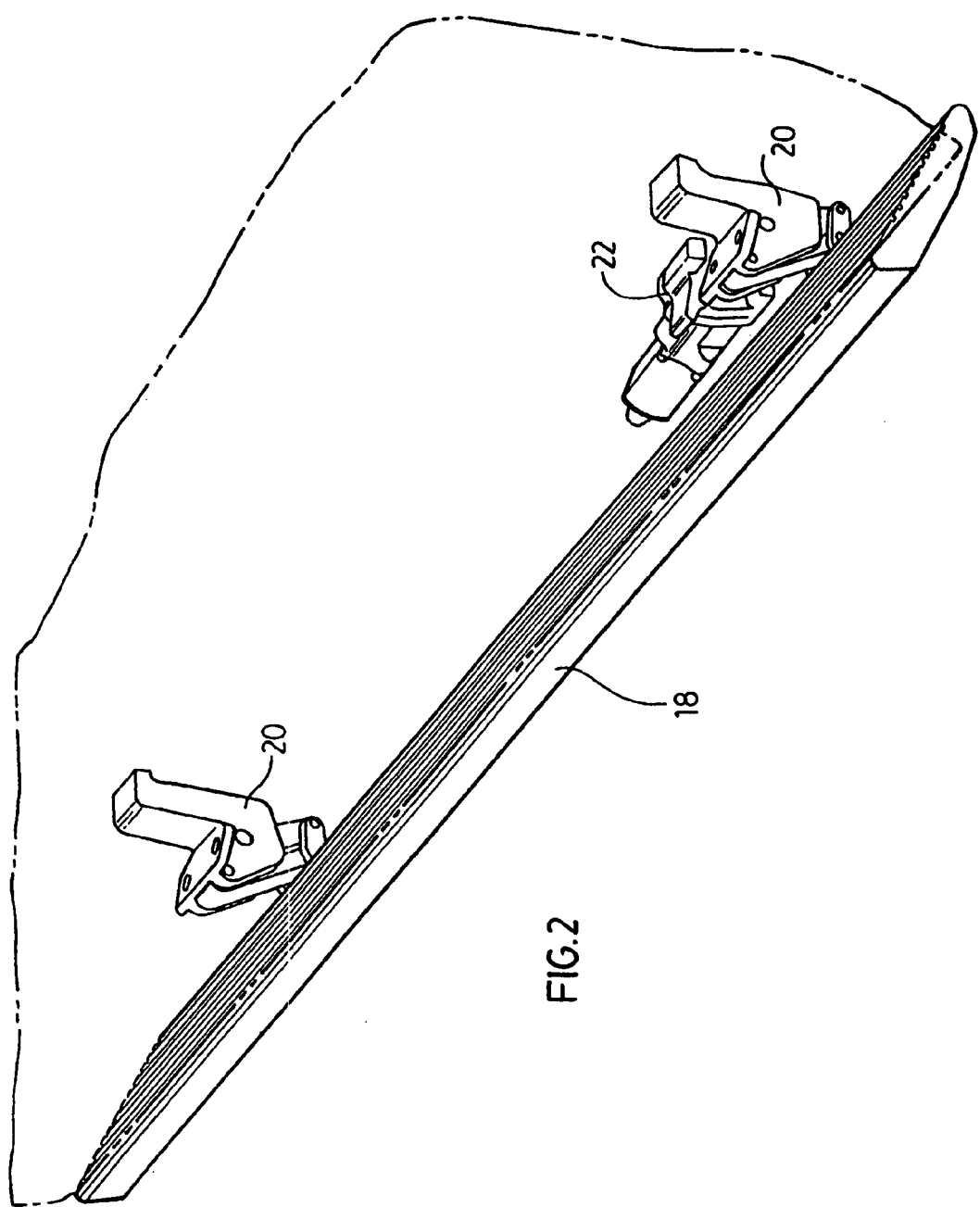
FIG. 2 is a partial perspective view of the embodiment of FIG. 1, with the deck in a retracted position.
Figure 3:
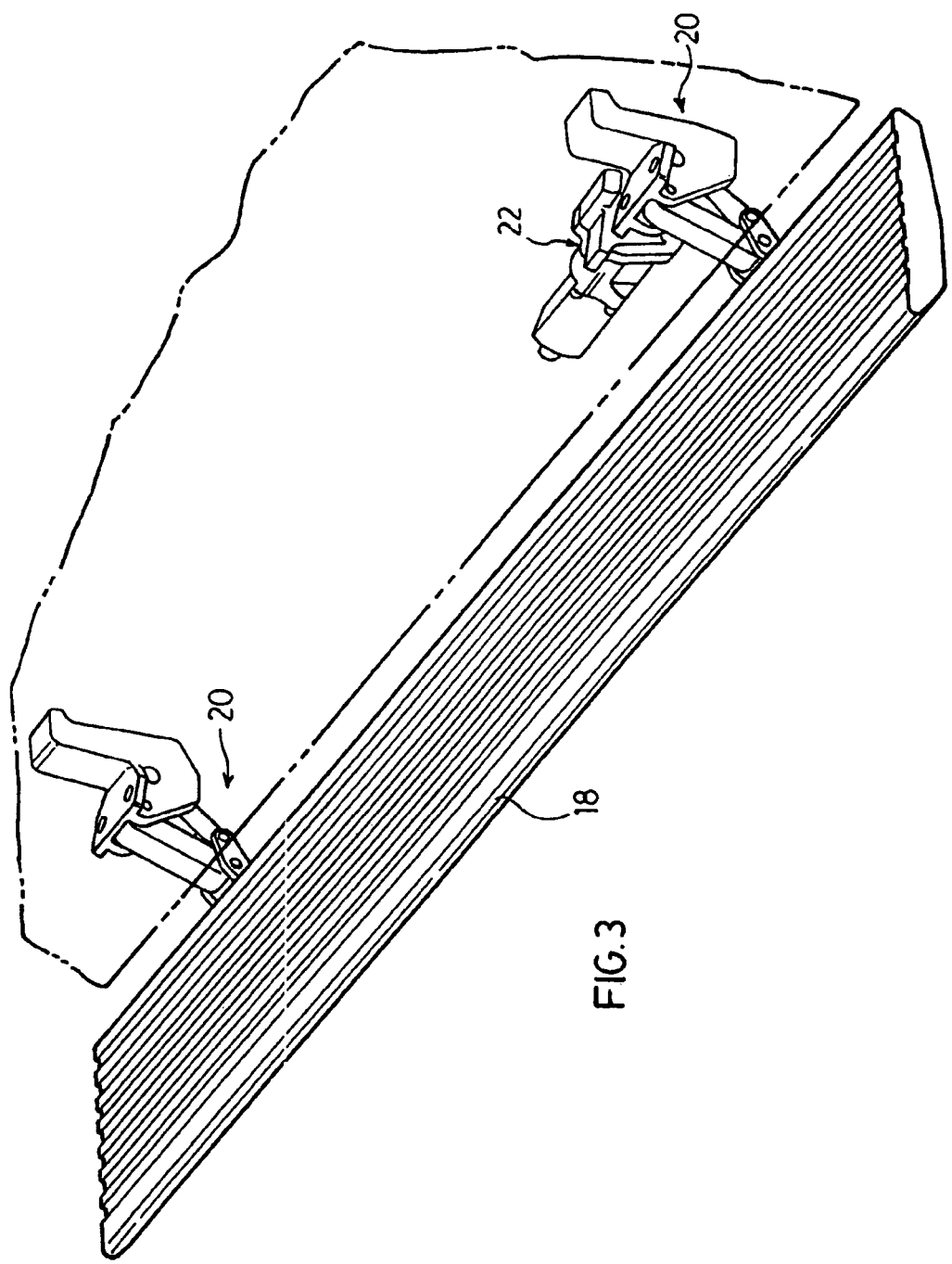
FIG. 3 is a partial perspective view of the embodiment of FIG. 1, with the deck in an extended or operable position.

Referring to FIGS. 2 and 3, the running board 10 is illustrated in greater detail. The running board 10 comprises a deck 18, at least two support hinges 20 and a drive motor assembly 22. Drive motor assembly 22 operably engages at least one of the support hinges to move the deck between a retracted or stored condition (FIG. 2) and an extended or deployed condition (FIG. 3).

Figure 4:
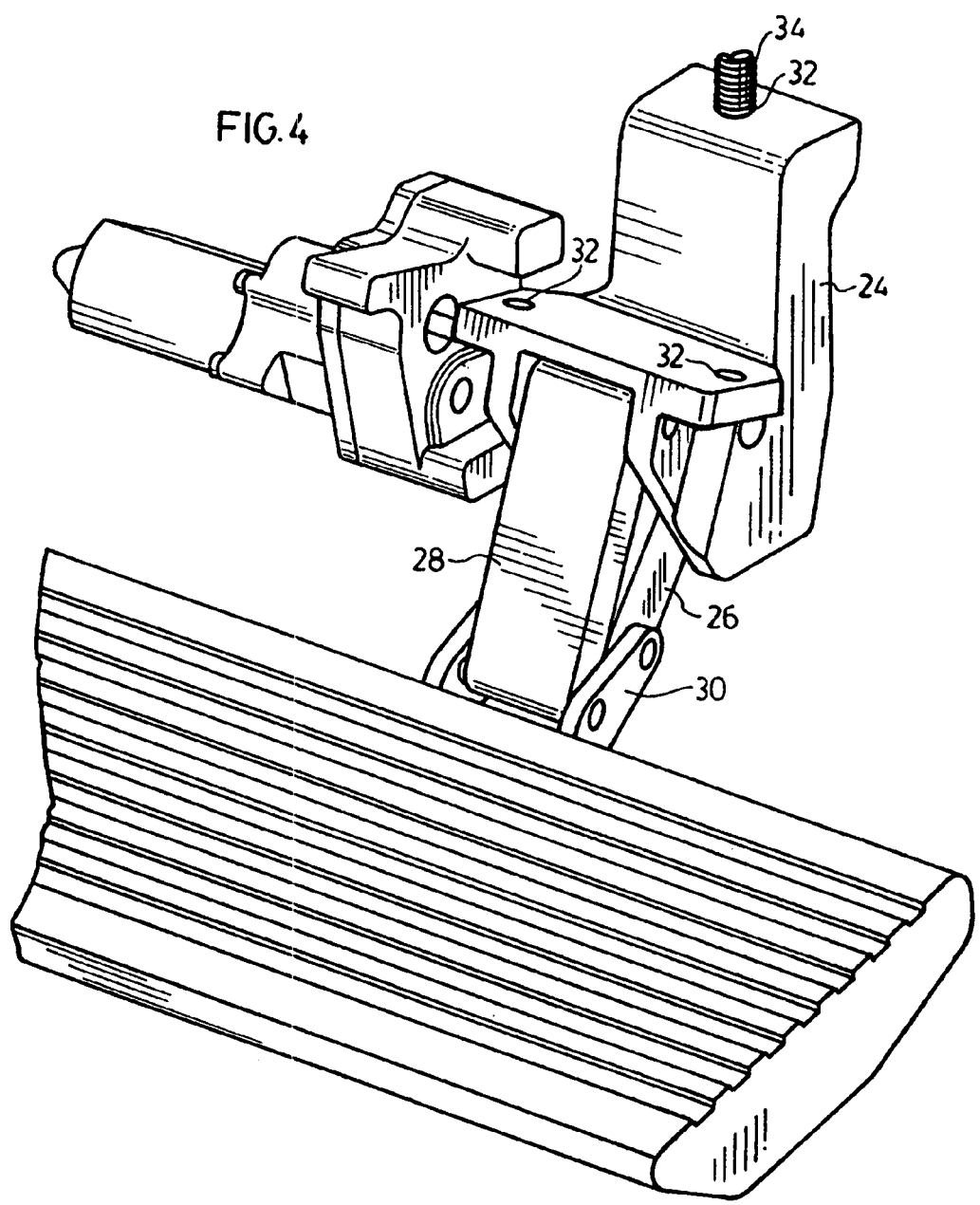
FIG. 4 is a partial perspective view of the hinge and drive of the embodiment of FIG. 1.
Figure 5:
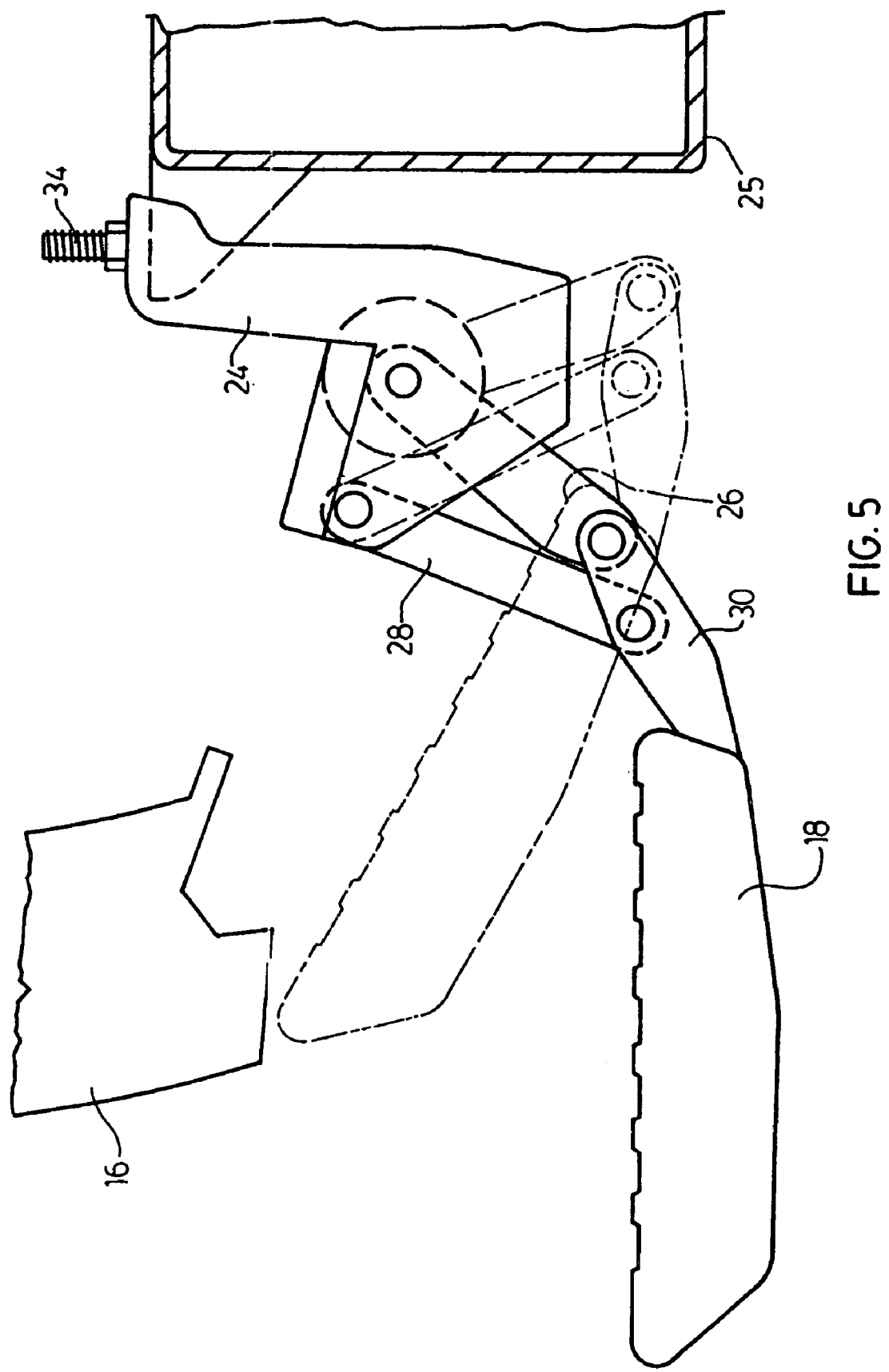
FIG. 5 is an end elevational view of embodiment of FIG. 1.

Referring to FIGS. 4 and 5, each hinge 20 comprises an L-shaped bracket 24, a pair of links 26, 28 and a bracket 30. L-shaped bracket 24 is configured to the shape of the frame section to which the running board is to be attached. The configuration will thus change depending on the particular vehicle application. The L-shaped bracket 24 has a plurality of apertures 32, through which, mounting bolts 34 extend to mount the bracket 24 to the vehicle frame 25.

The two links 26 and 28 are pivotally mounted to the bracket 24 and bracket 30. Links 26 and 28 are of unequal length. The pivot points between the links 26, 28 on bracket 24 are spaced at a greater distance than pivots points on bracket 30. The particular arrangement provides the desired movement of the deck 18 between the retracted (dashed lines) and extended positions (solid lines).

Figure 6:
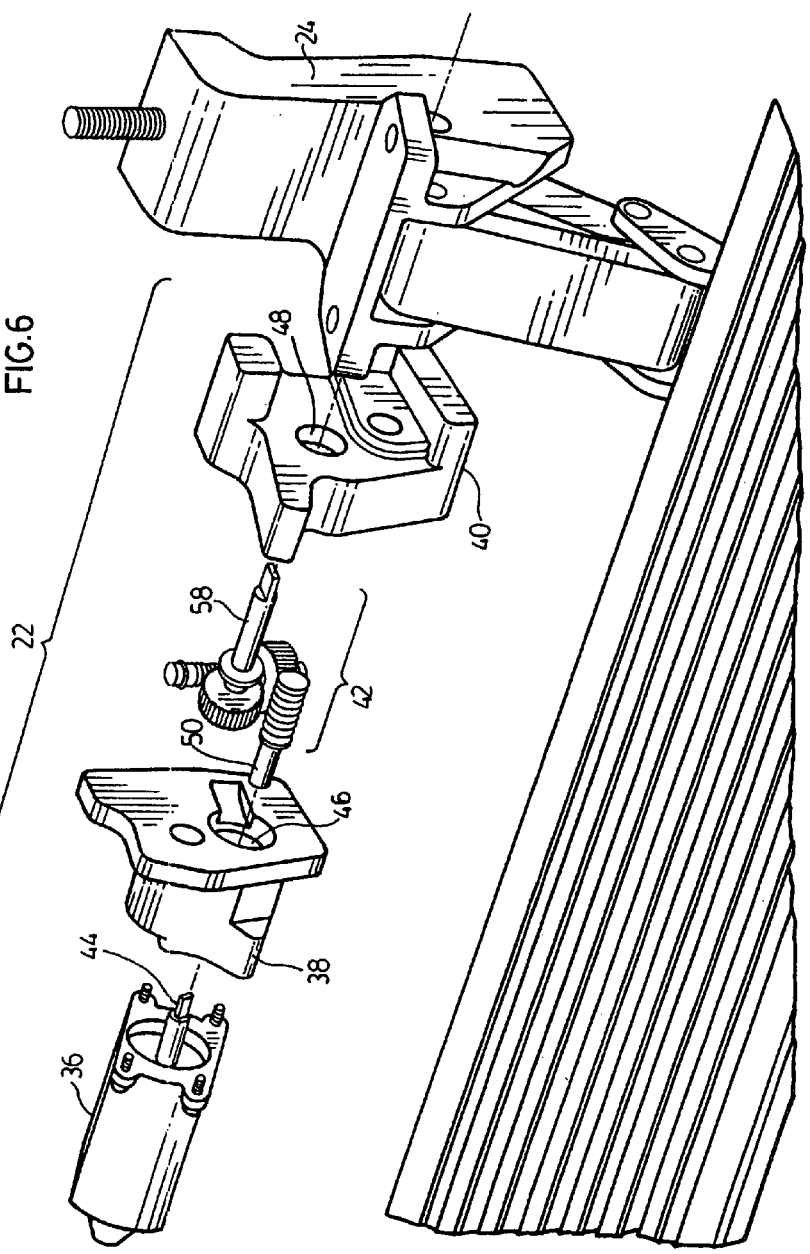
FIG. 6 is a partial perspective view of embodiment of FIG. 1, with the drive motor assembly in exploded view.

Referring to FIG. 6, the drive motor assembly 22 is illustrated in exploded view. The drive motor assembly 22 comprises a motor 36, a gear housing half 38, an opposite gear housing half 40 and a gear train and clutch assembly 42.

The motor 36 has a spindle 44. The end of the motor 36 is configured to mount onto the housing half 38. Housing half 38 has a longitudinal bore 46 that extends therethrough. Spindle 44 extends into bore 46. Motor 36 mounts in a substantially longitudinal direction.

Opposite housing half 40 has a bore 48 that extends therethrough. Housing half 40 is configured to mount onto bracket 24. When housing half 38 and 40 are closed together, bore 48 has a first axis that extends parallel to a second axis of bore 46, but will be spaced apart. The inner faces of each housing half 38 and 40 are configured to journal mount the components of the gear train and clutch assembly 42.

Referring to FIG. 7, the gear train and clutch assembly 42 comprises a first worm gear 50, a first spur gear 52, a second worm gear 53, a second spur gear 54, an outer closed ring 55, an inner tolerance ring 56 and drive shaft 58. First worm gear 50 is journal mounted in housing 38, 40 so that a spindle end extends into bore 46. Spindle 44 of motor 36 engages with the first worm gear 50 in a driving engagement. In the preferred embodiment, the spindle 44 has a tab 60 that is inserted into a slot 62 in the end of first worm gear 50. Rotation of spindle 44 is transferred to worm gear 50. Worm gear 50 is in meshing engagement with spur gear 52. Spur gear 52 is mounted on a common axle with second worm gear 53. Spur gear 52 and worm gear 53 are journal mounted within the housing 38, 40, generally perpendicular to first worm gear 50. Driving rotation of spur gear 52 rotates second worm gear 53. Second spur gear 54 is mounted on spindle 58 through a bidirectional limited slip connection of closed ring 55 and tolerance ring 56. Spindle 58 is journal mounted within the housing 38, 40 to extend through bore 48. An end of the spindle 58 has a tab 64 that engages link 26 in driving engagement.

Closed ring 55 and tolerance ring 56 are bands of spring steel. Closed ring 55 is polished. Tolerance ring 56 has a series of circumferentially spaced embossments or ribs 57. The ring 56 is preferably not closed presenting a small gap 59, preferably of about 0.5 mm. Closed ring 55 and tolerance ring 56 are press fitted onto drive shaft 58. Spur gear 54 is fitted on closed ring 55 to maintain pressure between the inner and outer rings 55, 56. Closed ring 55 and tolerance ring 56 operate as a clutching mechanism. Preferably, the gear train and clutching assembly 42 is configured to transfer torques of about 50 nm.

The closed ring 55 and tolerance ring 56 are illustrated as mounting a driven second spur gear 54. However, it is now apparent to those skilled in the art that the closed ring 55 and tolerance ring 56 could be utilized to mount any of the other spurs or worm gears of gear train 42.

In operation, rotation of the motor 36 in a first sense will rotate the gear train 42 to rotate the link 26 and move the running board 10 from the retracted position to the extended position. Rotating the motor 36 in the opposite sense will move the running board 10 from the extended position to the retracted position.

If the deck 18 encounters an obstacle during its travel between the extended and retracted positions and deck movement is prevented, the tolerance ring 56 will allow the second spur gear 54 to rotate relative to the spindle 58, preventing damage to the deck. In the event of power failure or if the motor 36 is not energized and the deck is in the extended position, an operator may manually move the deck 18 from the extended position to the retracted position, since the spindle 58 is able to rotate relative to the second spur gear 54. The deck 18 is able to be manually retracted without back driving the motor 36.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that the invention may be practiced otherwise than as specifically described.

What is claimed is:

1. A powered running board assembly comprising:
   a deck having a longitudinal extent;
   at least two hinges extending from the deck for mounting the deck to an underside of a vehicle, each hinge comprising:
   a mounting bracket configured to mount to said underside, and
   a pair of links pivotally extending between said deck and mounting bracket,
   said hinges enabling said deck to be movable between a retracted position and an extended position, and
   a motor assembly operably engaging at least one of said hinges to drive said deck movement and mounted relative thereto to extend substantially longitudinally, said motor assembly having a gear train and clutch assembly including an inner tolerance ring presenting a gap formed therethrough and completely dividing an outer surface of said inner tolerance ring and an outer closed ring each mounting a gear for enabling said motor assembly to drive relative to said deck movement when said deck movement is prevented, and enabling manual deck movement when the motor assembly is not energized.

2. A powered running board assembly as claimed in claim 1, wherein said tolerance ring has a plurality of circumferentially spaced ribs, said plurality of circumferentially spaced ribs configured to transfer a predetermined amount of torque.

3. A powered running board assembly as claimed in claim 2, wherein said open gap is about 0.5 mm.

4. A powered running board assembly as claimed in claim 3, wherein said predetermined amount of torque is about 50 nm.

5. A powered running board as claimed in claim 4, wherein said gear train includes a driving shaft, a driven shaft and a drive gear and a driven gear and said clutch assembly is mounted on said driven shaft and said driven gear is mounted on said clutch assembly.

6. A powered running board as claimed in claim 4, wherein said gear train includes a driving shaft, a driven shaft and a drive gear and a driven gear and said clutch assembly is mounted on said driving shaft and said driving gear is mounted on said clutch assembly.

* * * * *